(12) United States Patent
Matsubara et al.

(10) Patent No.: US 9,197,135 B2
(45) Date of Patent: Nov. 24, 2015

(54) BI-DIRECTIONAL DC/DC CONVERTER WITH FREQUENCY CONTROL CHANGE-OVER

(71) Applicant: FUJI ELECTRIC CO., LTD., Kawasaki-shi (JP)

(72) Inventors: Kunio Matsubara, Hino (JP); Yukihiro Nishikawa, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/018,882

(22) Filed: Sep. 5, 2013

(65) Prior Publication Data
US 2014/0104890 A1    Apr. 17, 2014

(30) Foreign Application Priority Data
Oct. 12, 2012  (JP) .................. 2012-226966

(51) Int. Cl.
*H02M 3/335* (2006.01)
*H02M 3/337* (2006.01)
*H02M 1/00* (2007.01)

(52) U.S. Cl.
CPC ........ *H02M 3/33584* (2013.01); *H02M 3/3376* (2013.01); *H02M 2001/0058* (2013.01); *Y02B 70/1433* (2013.01); *Y02B 70/1491* (2013.01)

(58) Field of Classification Search
CPC .............. H02M 3/3376; H02M 3/156; H02M 3/33507; H02M 3/33592; H02M 2007/4815
USPC ............ 363/17, 21.02, 39, 40, 41, 79, 80, 81, 363/89, 95, 98, 127, 131, 132
See application file for complete search history.

(56) References Cited

U.S. PATENT DOCUMENTS

| 8,811,039 B2* | 8/2014 | The Ngo ........... H02M 3/33584 363/21.02 |
| 2005/0157522 A1* | 7/2005 | Osaka ............... H02M 3/33569 363/21.02 |
| 2010/0314945 A1* | 12/2010 | Yamazaki ............. H02M 3/157 307/80 |
| 2011/0006853 A1* | 1/2011 | Mohtashemi ......... H02M 3/156 332/110 |
| 2011/0286248 A1* | 11/2011 | Wang et al. ................. 363/21.18 |
| 2012/0105029 A1* | 5/2012 | Kawagoe ............. H02M 3/156 323/271 |

FOREIGN PATENT DOCUMENTS

| JP | 2001-037226 A | 2/2001 |
| JP | 2002-262569 A | 9/2002 |
| JP | 2011-120370 A | 6/2011 |

* cited by examiner

*Primary Examiner* — Jue Zhang
*Assistant Examiner* — Lakaisha Jackson
(74) *Attorney, Agent, or Firm* — Rabin & Berdo, P.C.

(57) ABSTRACT

A bi-directional DC/DC converter comprises bridge circuits connected to DC voltage sources, an isolation transformer, an LC resonance circuit, and detection circuits for detecting voltages and currents of the DC voltage sources. A control circuit in the power flow from a first DC voltage source to a second DC voltage source changes over between fixed frequency control and frequency modulation control according to the magnitude of a control variable, and a control circuit in the power flow from a second DC voltage source to the first DC voltage source changes over between fixed frequency control and frequency modulation control according to the magnitude of another control variable. Thus, the bi-directional DC/DC converter can be applied to devices with a wide range of input and output voltages.

11 Claims, 7 Drawing Sheets

1, 2: DC voltage source
3, 4: smoothing capacitor
5-12: semiconductor switching element
13, 14: resonance reactor
15, 16: resonance capacitor
17: isolation transformer

BI-DIRECTIONAL DC/DC CONVERTER WITH FREQUENCY CONTROL CHANGE-OVER

CROSS-REFERENCE TO RELATED APPLICATION

This application is based on, and claims priority to, Japanese Patent Application No. 2012-226966, filed on Oct. 12, 2012, contents of which are incorporated herein by reference.

BACKGROUND OF THE INVENTION

1. Field of the Invention

The present invention relates to a bi-directional DC/DC converter of an isolation type and resonance type applied to devices with a wide range of input and output voltage, such as a battery charger.

2. Description of the Related Art

FIG. 4 shows a traditional bi-directional DC/DC converter of an isolation type. The bi-directional DC/DC converter comprises: a first DC voltage source 1 with a DC voltage of V1, a second DC voltage source with a DC voltage of V2, smoothing capacitors 3 and 4, an isolation transformer 17, a first bridge circuit 18, a second bridge circuit 19, and a smoothing reactor 24. The transformer 17 has a primary winding N1 and a secondary winding N2, the numbers of winding thereof being represented by the same symbols N1 and N2.

The first bridge circuit 18 has semiconductor switching elements and converts a DC power to an AC power when the power flow is from the first DC voltage source 1 to the second DC voltage source 2 and converts an AC power to a DC power when the power flow is from the second DC voltage source 2 to the first DC voltage source 1. The second bridge circuit 19 has semiconductor switching elements and converts a AC power to an DC power when the power flow is from the first DC voltage source 1 to the second DC voltage source 2 and converts a DC power to an AC power when the power flow is from the second DC voltage source 2 to the first DC voltage source 1.

The semiconductor switching elements composing the first and second bridge circuits 18 and 19 can be a reverse-conducting element such as an IGBT or a MOSFET having an antiparallel-connected diode.

Patent Document 1 (identified further on) discloses a conventional technology equivalent to a bi-directional DC/DC converter of this type.

Each of the first and second bridge circuits 18 and 19 in FIG. 4 exhibits both the capabilities of converting an AC power to a DC power and converting a DC power to an AC power. Consequently, the bi-directional DC/DC converter of FIG. 4 does not need to be equipped with distinct dedicated circuits corresponding to the power flow direction and can be a simplified, small-scale device.

The bi-directional DC/DC converter disclosed in Patent Document 1 conducts hard switching based on pulse width modulation (PWM) control. As a result, when the power flow is from the first DC voltage source 1 to the second DC voltage source 2, the semiconductor switching element is subjected to a surge voltage $V2+\Delta V$ exceeding the voltage V2 of the second DC voltage source 2 across the switching element during the time the semiconductor switching element of the second bridge circuit 19 in rectifying operation is turning OFF in which the diode is in a reverse recovery process. As a result, semiconductor switching elements composing the second bridge circuit 19 are necessarily semiconductor switching elements with high withstand voltage, which generally produce large loss. This causes a problem of low efficiency of the device. This problem arises as well in the first bridge circuit 18 in the case of the power flow from the second DC voltage source 2 to the first DC voltage source 1.

A conventional technology to solve this problem is disclosed in Patent Document 2 (identified further on), for example, which is a resonance type bi-directional DC/DC converter performing pulse frequency modulation (PFM) control utilizing a resonance phenomenon of an LC resonance circuit.

FIG. 5 shows an example of construction of the main circuit of the conventional resonance type bi-directional DC/DC converter. The circuit components in FIG. 5 serving the same function as those in FIG. 4 are given the same symbols and the description thereof is omitted, and the different points are mainly explained here.

Referring to FIG. 5, this resonance type bi-directional DC/DC converter comprises resonance reactors 13 and 14, and resonance capacitors 15 and 16. The first bridge circuit 18 is composed of IGBTs 5 through 8, which are semiconductor switching elements, each having an anti-parallel-connected diode, and the second bridge circuit 19 is composed of IGBTs 9 through 12. The gate terminals of the IGBTs 5 through 12, as well as the gate signals, are designated by the symbols G1 through G8.

FIGS. 6 and 7 show construction of control means for generating the gate signals G1 through G8 for the IGBTs 5 through 12.

FIG. 6 shows a construction for generating the gate signals G1 through G4 for the IGBTs 5 through 8, which comprises a second detection circuit 21 for detecting the voltage V2 and the current I2 of the second DC voltage source 2, and a first control circuit 25 for generating the gate signals G1 through G4 according to the detected values by the detection circuit 21. FIG. 7 shows a construction for generating the gate signals G5 through G8 for the IGBTs 9 through 12, which comprises a first detection circuit 20 for detecting the voltage V1 and the current I1 of the second DC voltage source 1, and a second control circuit 26 for generating the gate signals G5 through G8 according to the detected values by the detection circuit 20. All the gate signals G1 through G8 are given through a respective gate driving circuit (not shown in the figure) to the IGBTs 5 through 12.

In the case the power flow is from the first DC voltage source 1 to the second DC voltage source 2 in the DC/DC converter of FIG. 5, the voltage of each of the semiconductor switching elements 9 through 12 in rectifying operation is clamped at the voltage V2 of the second DC voltage source 2 in the process of reverse recovery of the accompanying diodes. In the case the power flow is from the second DC voltage source 2 to the first DC voltage source 1, the voltage of each of the semiconductor switching elements 5 to 8 in rectifying operation is clamped at the voltage V1 of the second DC voltage source 1.

Consequently, the semiconductor switching elements 5 through 12 used here can be semiconductor switching elements with a low withstand voltage that generally produce a small loss. Thus, the bi-directional DC/DC converter of FIG. 5 exhibits higher efficiency than the bi-directional DC/DC converter of FIG. 4.

As described above, a resonance type bi-directional DC/DC converter that performs frequency modulation control can improve efficiency of the converter.

However, as pointed out in Patent Document 3 (identified further on), a characteristic of output voltage versus switching frequency changes depending on a magnitude of the load.

In a case of light load or no load, in particular, the output voltage cannot be decreased below a certain value even if the switching frequency is infinitely increased. Therefore, it can be hard to apply the bi-directional DC/DC converter of FIG. 5 to devices with a wide range of input/output voltage, such as battery chargers.

[Patent Document 1]
  Japanese Unexamined Patent Application Publication No. 2001-037226 (paragraphs 0016-0041, FIG. 2, in particular)
[Patent Document 2]
  Japanese Unexamined Patent Application Publication No. 2011-120370 (paragraphs 0010 through 0044, and FIGS. 1 and 2, in particular)
[Patent Document 3]
  Japanese Unexamined Patent Application Publication No. 2002-262569 (paragraphs 0002 and 0003, in particular)

The problem pointed out in Patent Document 3 is mentioned specifically in the following.

The resonance type bi-directional DC/DC converter of FIG. 5 is assumed to specify that the voltage of the first DC voltage source 1 is V1 and the voltage of the second DC voltage source 2 is controlled in the range from V2min to V2max. In the design of the converter based on the operation with the power flow from the second DC voltage source 1 to the second DC voltage source 2, a bi-directional DC/DC converter of a resonance type cannot deliver an output voltage below a certain value in a light load or no load condition. Thus, the winding ratio "a" of the isolation transformer 17 is a=N1/N2=V1/V2min.

Consequently, the minimum output voltage V2min from the second bridge circuit 19 in the case of the power flow from the first DC voltage source 1 to the second DC voltage source 2, is V2min=(1/a)×V1. Here, the switching frequency of the IGBTs 5 through 8 is set at the resonance frequency fr of the LC circuit composed of the resonance reactor 13 and the resonance capacitor 15. The maximum output voltage V2max in this case is V2max=(1/a)×V1×α, in which α is a voltage gain when the switching frequency is set at a value lower than the resonance frequency fr.

Thus, a voltage in the range from V2min to V2max is delivered.

Next, the case of power flow from the second DC voltage source 2 to the first DC voltage source 1 is considered. When the input voltage to the second bridge circuit 19 is the minimum input voltage V2min, the voltage V1=a×V2min. Thus, the voltage V1 can be delivered by setting the switching frequency of the IGBT 9 through 12 at the resonance frequency fr. When the input voltage to the second bridge circuit 19 is the maximum input voltage V2max, however, V1<a× V2max. Thus, the switching frequency needs to be made higher than the resonance frequency fr.

Since the output voltage of a bi-directional DC/DC converter of a resonance type cannot be controlled below a certain value even if the switching frequency is increased infinitely, a desired output voltage V1 would not be obtained in a light load or no load condition.

Therefore, it can be hard to apply a resonance type bi-directional DC/DC converter using pulse frequency modulation control to devices with a wide range of input/output voltage.

SUMMARY OF THE INVENTION

It is therefore an object of the present invention to provide a bi-directional DC/DC converter of a resonance type that can be applied to devices with a wide range of input/output voltage.

In order to achieve the above object, the first aspect of the present invention is a bi-directional DC/DC converter comprising a first bridge circuit connected to a first DC voltage source, a second bridge circuit connected to a second DC voltage source, an isolation transformer connected between an AC side of the first bridge circuit and an AC side of the second bridge circuit through an LC resonance circuit(s), a first detection circuit for detecting a voltage and a current of the first DC voltage source, a second detection circuit for detecting a voltage and a current of the second DC voltage source, a first control circuit for controlling semiconductor switching elements of the first bridge circuit, and a second control circuit for controlling semiconductor switching elements of the second bridge circuit.

Each of the first and second control circuits has a control means for performing fixed frequency control of the semiconductor switching elements of the first and the second bridge circuits at around a resonance frequency of the LC resonance circuit, and a control means for performing frequency modulation control of the semiconductor switching elements of the first and second bridge circuits at a frequency lower than the resonance frequency.

The first control circuit also has a first change-over means for performing change-over of the first bridge circuit between the fixed frequency control and the frequency modulation control based on a magnitude of a control variable determined according to detected values by the second detection circuit in a mode of supplying electric power from the first DC voltage source to the second DC voltage source, and the second control circuit also has a second change-over means for performing change-over of the second bridge circuit between the fixed frequency control and the frequency modulation control based on a magnitude of a control variable determined according to detected values by the first detection circuit in a mode of supplying electric power from the second DC voltage source to the first DC voltage source.

A bi-directional DC/DC converter of a second aspect of the present invention is the bi-directional DC/DC converter of the first aspect of the invention wherein, when the first control circuit controls the voltage of the second DC voltage source at a value higher than the maximum voltage that can be delivered in a range of the fixed frequency control of the first bridge circuit, the first control circuit operates the first change-over means to change-over a control mode for the first bridge circuit from the fixed frequency control to the frequency modulation control.

A bi-directional DC/DC converter of a third aspect of the present invention is the bi-directional DC/DC converter of the first or second aspect of the invention wherein, when the second control circuit controls the voltage of the first DC voltage source at a value lower than the minimum voltage that can be delivered in a range of the frequency modulation control of the second bridge circuit, the second control circuit operates the second change-over means to change-over a control mode for the second bridge circuit from the frequency modulation control to the fixed frequency control.

The fixed frequency control can be carried out by controlling the bridge circuit by means of pulse width modulation, or alternatively, by means of phase modulation.

A bi-directional DC/DC converter of the present invention expands the range of voltage that can be delivered in bi-directional conversion of DC voltage between a first DC voltage source and a second DC voltage source. Therefore, the bi-directional DC/DC converter can be favorably applied to battery chargers, for example.

DETAILED DESCRIPTION OF THE INVENTION

Figure 1:
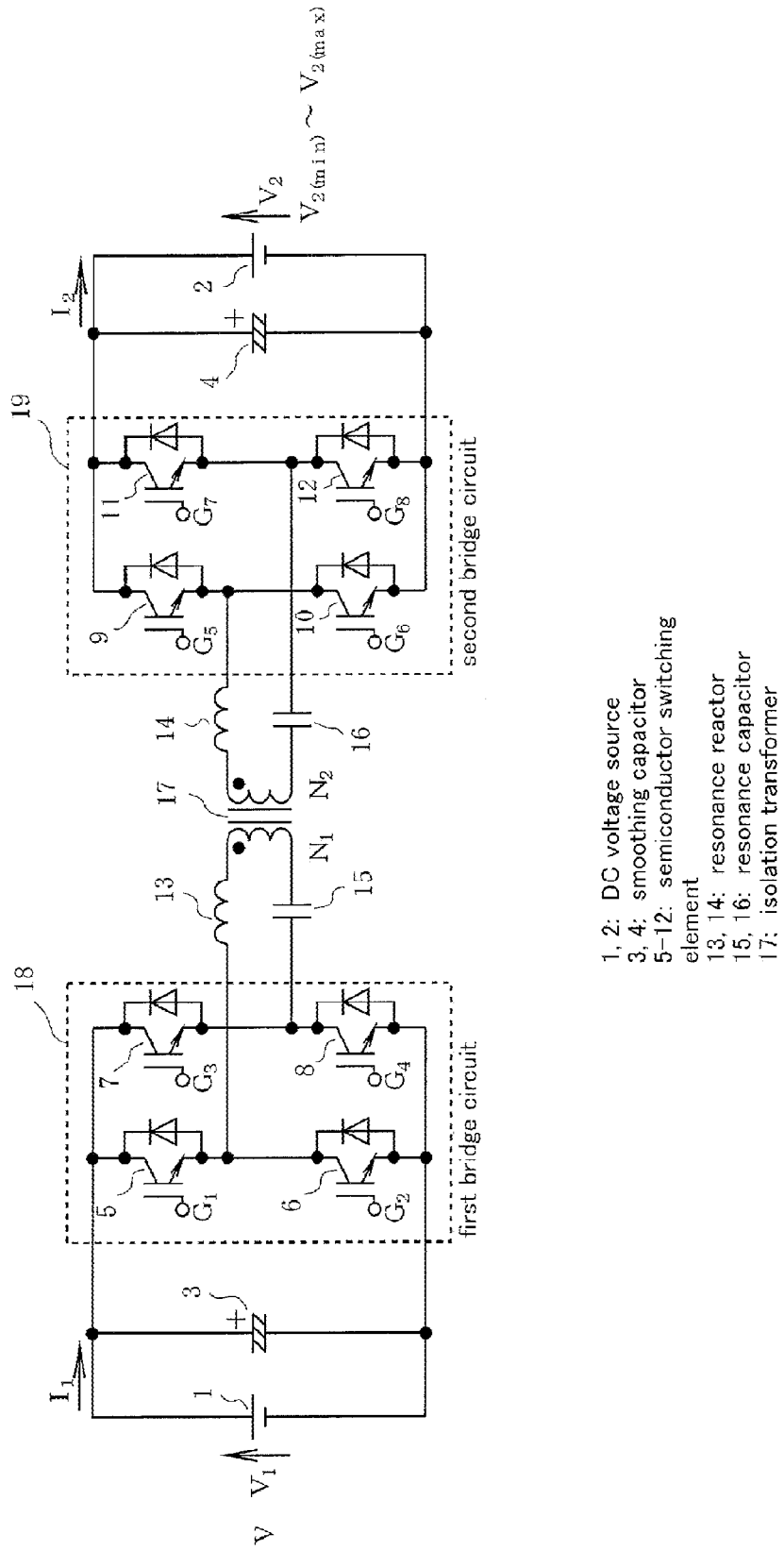
FIG. 1 shows an example of construction of a main circuit of a bi-directional DC/DC converter according to an embodiment of the present invention.
Figure 4:
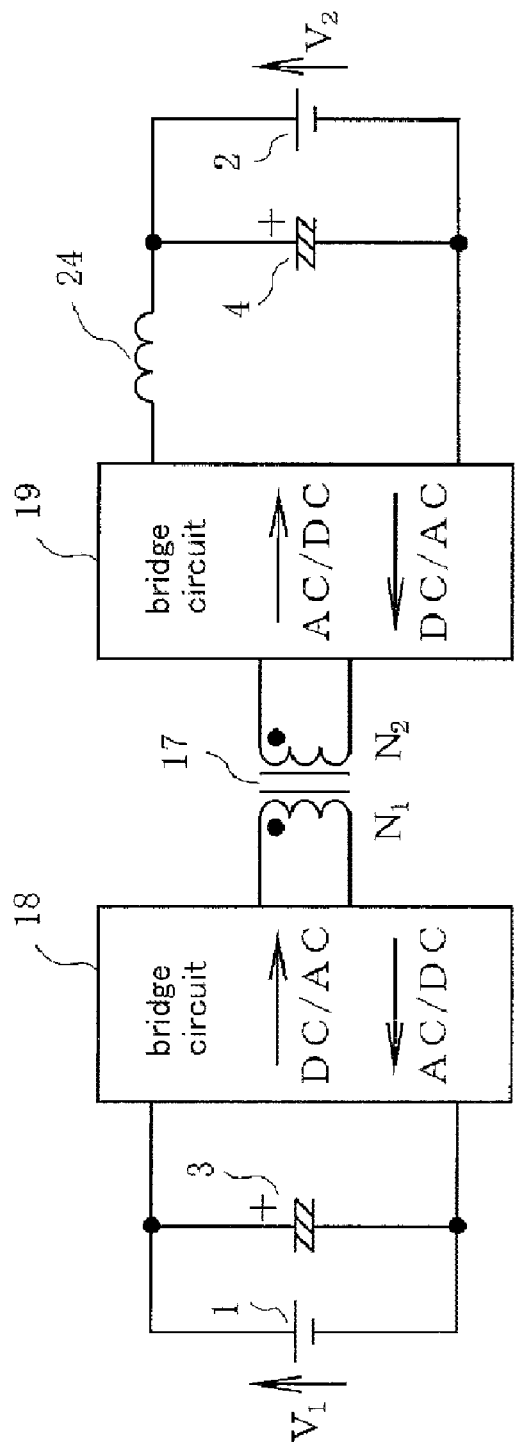
FIG. 4 shows an example of construction of a main circuit of a bi-directional DC/DC converter according to a conventional technology.
Figure 5:
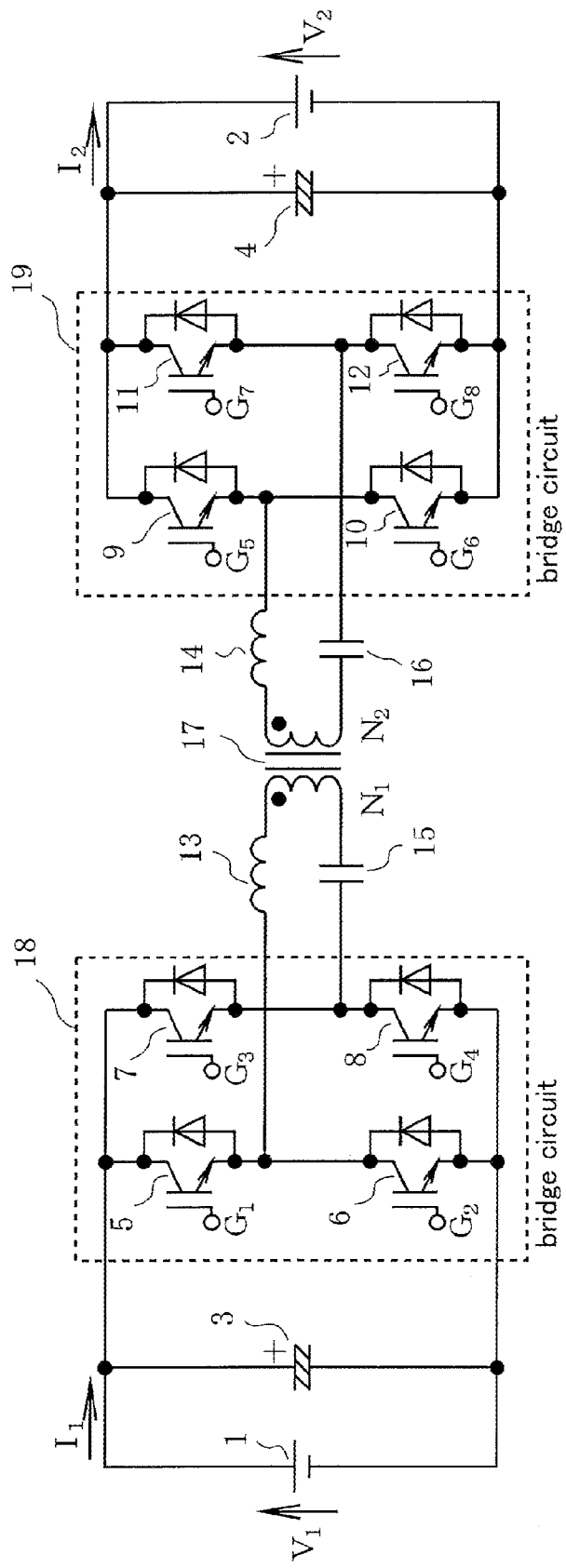
FIG. 5 shows an example of construction of a main circuit of a bi-directional DC/DC converter of a resonance type according to a conventional technology.
Figure 6:
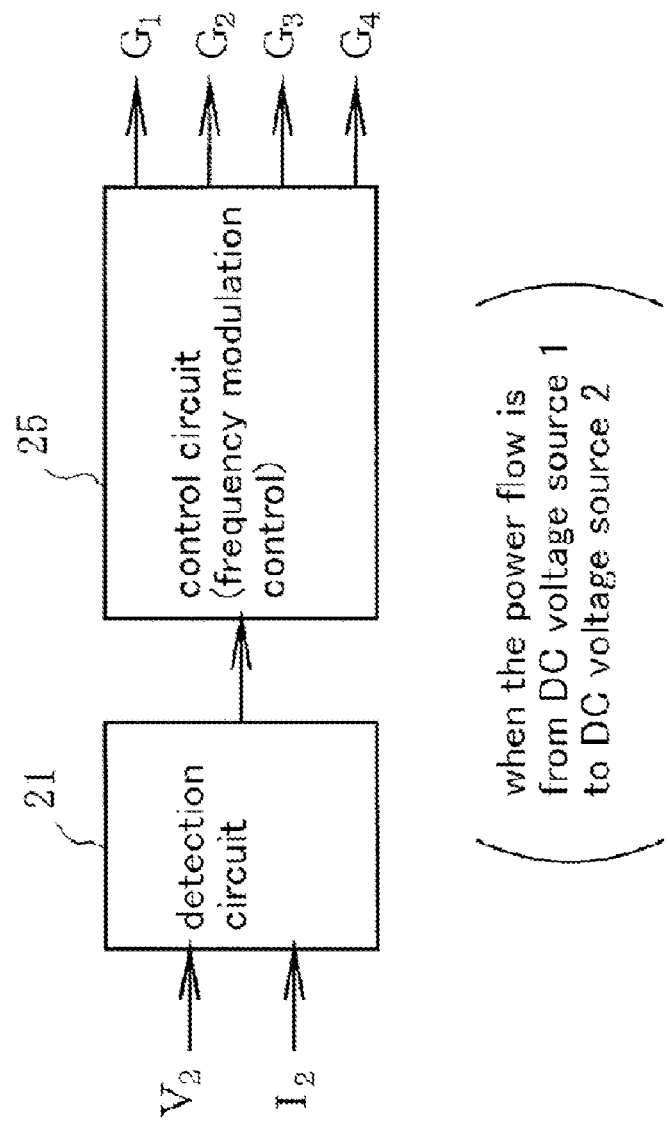
FIG. 6 shows an example of construction of a control means for generating a gate signal to the first bridge circuit of the bi-directional DC/DC converter of FIG. 5.
Figure 7:
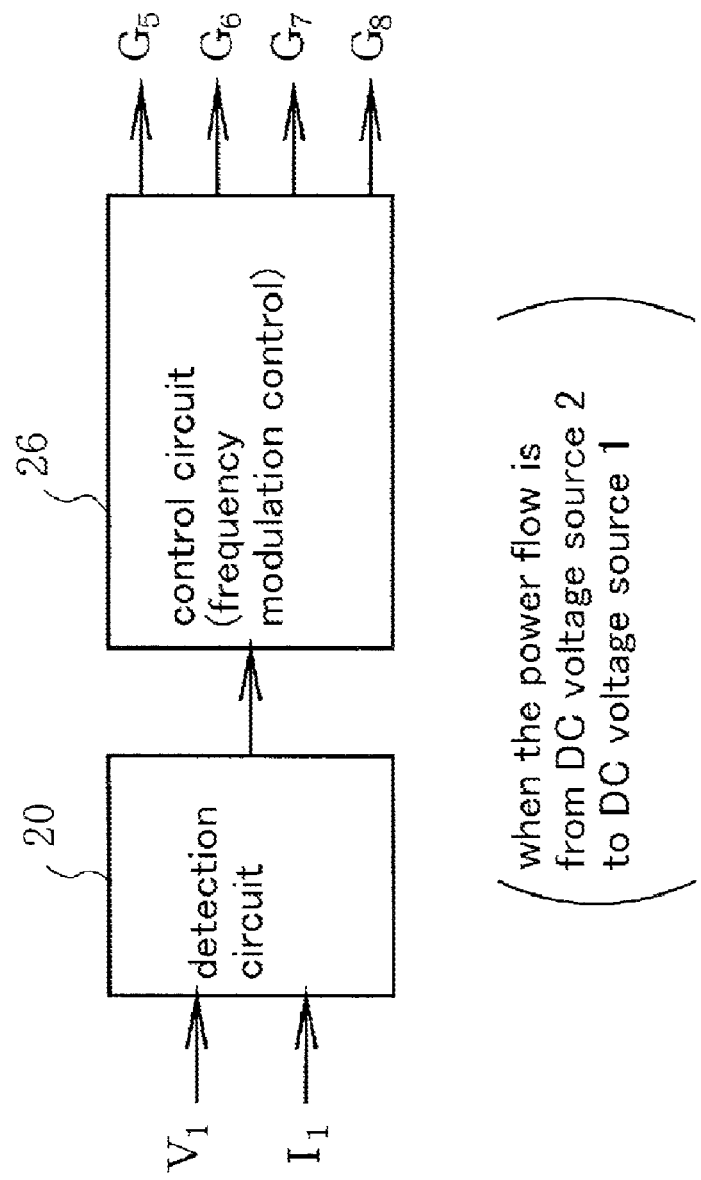
FIG. 7 shows an example of construction of a control means for generating a gate signal to the second bridge circuit of the bi-directional DC/DC converter of FIG. 5.

The following describes some illustrative embodiments of the present invention with reference to accompanying drawings. FIG. 1 shows an example of construction of a main circuit of a resonance type bi-directional DC/DC converter according to an embodiment of the invention. Although this main circuit is the same as the one shown in FIG. 4, explanation is made again in the following in order to clarify the circuit construction.

Referring to FIG. 1, the both terminals of a parallel-connected circuit of a first DC voltage source 1 (voltage of which is V1) and a smoothing capacitor 3 are connected to a pair of DC terminals of a first bridge circuit 18. The bridge circuit 18 is composed of IGBTs 5 through 8 each having an anti-parallel-connected diode. Between a pair of AC terminals, a resonance reactor 13, a primary winding N1 of an isolation transformer 17, and a resonance capacitor 15 are connected in series.

A terminal of a secondary winding N2 of the isolation transformer 17 is connected through a resonance reactor 14 to an AC terminal of a second bridge circuit 19, and the other terminal of the secondary winding N2 is connected through a resonance capacitor 16 to the other AC terminal of the secondary bridge circuit 19.

The second bridge circuit 19, similarly to the first bridge circuit 18, is composed of IGBTs 9 through 12 each having an anti-parallel-connected diode. Between a pair of DC terminals of the bridge circuit 19 is a parallel-connected circuit of a second DC voltage source 2 (voltage of which is V2) and a smoothing capacitor 4. Here, the inductance values of the resonance reactors 13 and 14 are substantially equal, and the capacitances of the resonance capacitors 15 and 16 are substantially equal. A symbol fr designates a resonance frequency of an LC circuit of the resonance reactor 13 and the resonance capacitor 15, which is equal to a resonance frequency of an LC circuit of the resonance reactor 14 and the resonance capacitor 16.

Figure 2:
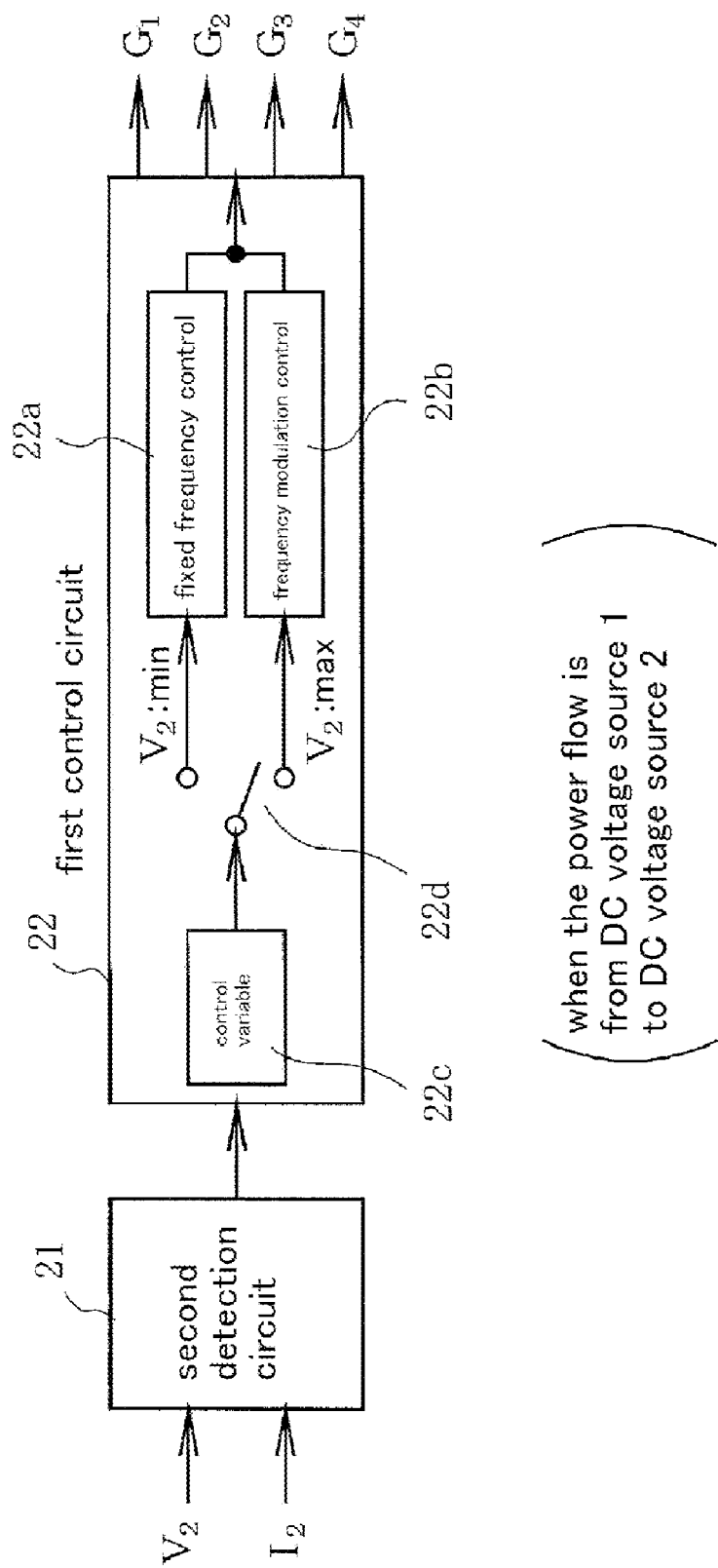
FIG. 2 shows an example of construction of a control means for generating a gate signal to the first bridge circuit of the bi-directional DC/DC converter of FIG. 1.
Figure 3:
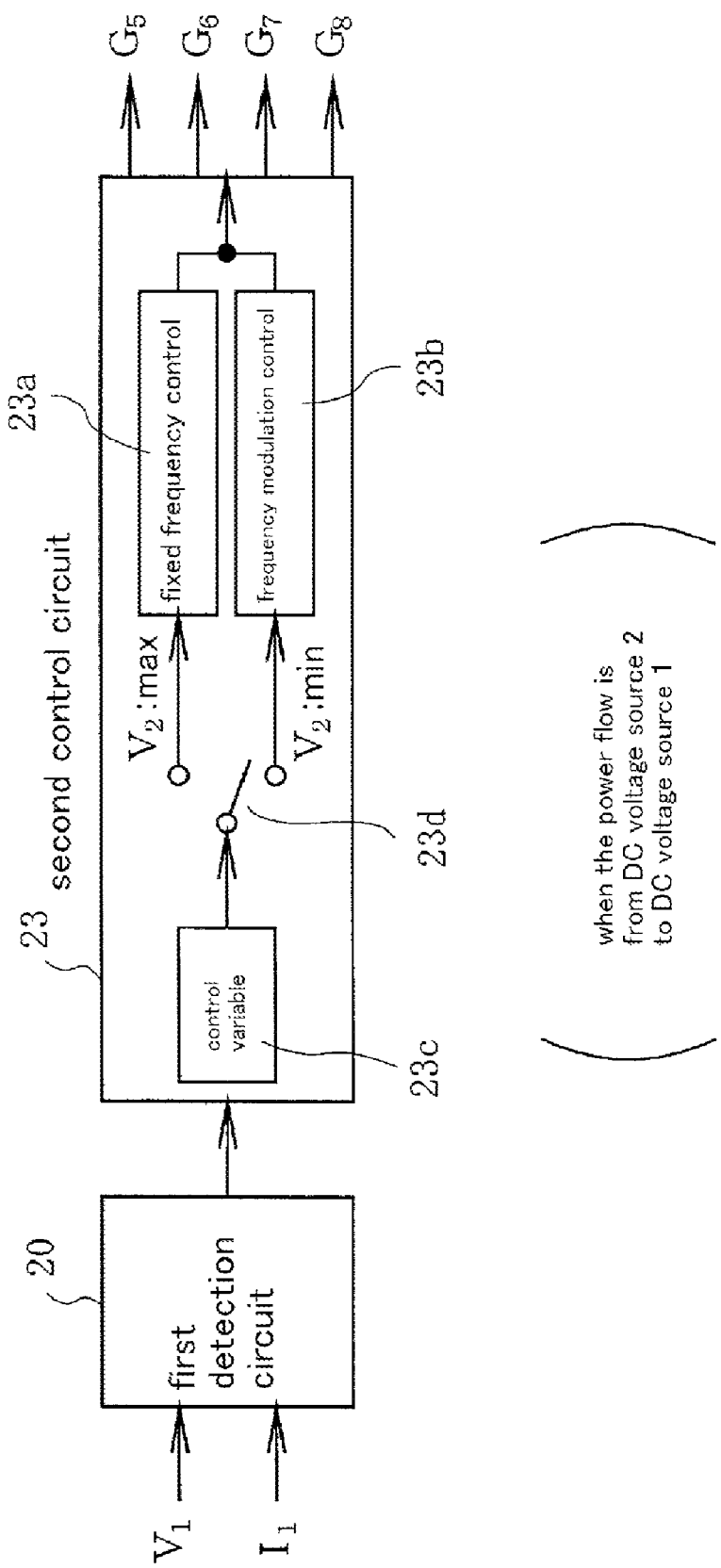
FIG. 3 shows an example of construction of a control means for generating a gate signal to the second bridge circuit of the bi-directional DC/DC converter of FIG. 1.

FIG. 2 shows a construction of a control means for generating gate signals G1 through G4 for the IGBTs 5 through 8. FIG. 3 shows a construction of a control means for generating gate signals G5 through G8 for the IGBTs 9 through 12.

The control means shown in FIG. 2 has a second detection circuit 21 for detecting the voltage V2 and the current I2 of the second DC voltage source 2 and a first control circuit 22 for generating the gate signals G1 through G4 for the IGBTs 5 through 8 using the output signals of the second detection circuit 21. The control means shown in FIG. 3 has a first detection circuit 20 for detecting the voltage V1 and the current I1 of the first voltage source 1 and a second control circuit 23 for generating the gate signals G5 through G8 for the IGBTs 9 through 12 using the output signals of the first detection circuit 20.

All the gate signals G1 through G8 are given to the IGBTs 5 through 12 via respective gate driving circuits not shown in the figure.

The first control circuit 22 comprises a fixed frequency control means 22a that generates gate signals using a carrier of a fixed frequency around the resonance frequency fr and a frequency modulation control means 22b (conducting pulse frequency modulation) that generates gate signals using a carrier of a frequency lower than the resonance frequency fr. The control by the fixed frequency control means 22a can be carried out by means of pulse width modulation (PWM) control or phase modulation control, for example.

Either one of the fixed frequency control means 22a or the frequency modulation control means 22b is selected to generate the gate signals G1 through G4 for the IGBTs 5 through 8 by operating a change-over means 22d corresponding to the magnitude of the voltage V2 and based on a control variable 22c determined corresponding to the values of the voltage V2 and the current I2 detected by the second detection circuit 21.

Similarly, the second control circuit 23 comprises a fixed frequency control means 23a that generates gate signals using a carrier of a fixed frequency around the resonance frequency fr and a frequency modulation control means 23b (conducting pulse frequency modulation) that generates gate signals using a carrier of a frequency lower than the resonance frequency fr. Either one of the fixed frequency control means 23a or the frequency modulation control means 23b is selected to generate the gate signals G5 through G8 for the IGBTs 9 through 12 by operating a change-over means 23d corresponding to the magnitude of the voltage V2 and based on the magnitude of a control variable 23c determined corresponding to the values of the voltage V1 and the current I1 detected by the first detection circuit 20. The control by the fixed frequency control means 23a can also be carried out by means of pulse width modulation control or phase modulation control.

The control variable 22c indicated in FIG. 2 is the magnitude of a control variable to equalize the detected values of the voltage V2 and the current I2 to the respective command values, and the control variable 23c indicated in FIG. 3 is the magnitude of a control variable to equalize the detected values of the voltage V1 and the current I1 to the respective command values.

The same specification as that for the conventional device described previously is assumed in the following description for the bi-directional DC/DC converter of the embodiment shown in FIGS. 1, 2, and 3. Namely, the voltage of the first DC voltage source 1 is V1 and the voltage of the second DC voltage source 2 is controlled in the range from V2min to V2max. The design is basically conducted for the operation with the power flow from the first DC voltage source 1 to the second DC voltage source 2.

Here, the middle voltage value V2mid between the V2min and V2max is set for the magnitude of the voltage V2 at which the change-over means 22d changes over between the fixed frequency control means 22a and the frequency modulation control means 22b. Thus, the fixed frequency control means 22a is selected if the voltage V2 is smaller than the reference value of the middle voltage V2mid, and the frequency modulation control means 22b is selected if the voltage V2 is not smaller than the voltage V2mid. In other words, the minimum output voltage for operation of the frequency modulation control means 22b is the voltage V2mid. The winding ratio 'a' of the isolation transformer 17 is set at a=N1/N2=V1/V2mid.

Consequently, the voltage V2mid and the frequency at which change-over between the fixed frequency control means 22a and the frequency modulation control means 22b is conducted are fixed regardless of the magnitude of the load. The switching frequency in the fixed frequency control is always the resonance frequency fr, and the switching frequency in the frequency modulation control is lower than the resonance frequency fr.

In the case of the power flow from the first DC voltage source 1 to the second DC voltage source 2, the first control circuit 22 operates the change-over means 22d to change-over, according to the magnitude of the control variable 22c, the first bridge circuit 18 into fixed frequency control so as to control the voltage of the second voltage source 2 at a voltage smaller than the voltage V2mid. The first bridge circuit 22 operates the change-over means 22d to change-over the first bridge circuit 18 into frequency modulation control (switching frequency<fr) so as to control the voltage of the second voltage source 2 at a voltage not smaller than the voltage V2mid. In this way, the voltage V2 of the second voltage source 2 can be controlled in the range from V2min to V2max when the voltage of the first DC voltage source 1 is V1.

In the case of the power flow from the second DC voltage source 2 to the first DC voltage source 1, the second control circuit 23 operates the change-over means 23d to change-over, according to the magnitude of the control variable 23c, the second bridge circuit 19 into frequency modulation control (switching frequency<fr) to control the voltage of the first DC voltage source 1 at V1 when the voltage V2 of the second DC voltage source 2 is lower than V2mid. When the voltage V2 of the second DC voltage source 2 is not smaller than V2mid and the target voltage V1 is smaller than a voltage that can be delivered by frequency modulation control, the second control circuit 23 operates the change-over means 23d to change-over the second bridge circuit 19 into fixed frequency control (switching frequency=fr) to control the voltage of the first DC voltage source 1 at the voltage V1.

In this way, the voltage of the first DC voltage source 1 can be controlled at the voltage V1 when the voltage of the second DC voltage source 2 is in the range from V2min to V2max.

As described thus far, in the embodiment described above, a relationship between input and output voltages of the voltage V1 of the first DC voltage source 1 and the voltage of the second DC voltage source 2 in the range from V2min to V2max is held by changing-over the control mode of the bridge circuit between fixed frequency control and frequency modulation control, in both operations of the power flow from the first DC voltage source 1 to the second DC voltage source 2 and the power flow from the second DC voltage source 2 to the first DC voltage source 1.

In the description of the embodiment above, the semiconductor switching elements composing the first and second bridge circuits 18 and 19 are IGBTs. The semiconductor switching elements can be of course MOSFETs while providing the same advantages of the invention.

DESCRIPTION OF SYMBOLS 1, 2: DC voltage source
3, 4: smoothing capacitor
5-12: semiconductor switch
13, 14: resonance reactor
15, 16: resonance capacitor
17: isolation transformer
18, 19: bridge circuit
20, 21: detection circuit
22, 23: control circuit
22a, 23a: fixed frequency control means
22b, 23b: frequency modulation control means
22c, 23c: control variable

What is claimed is:

1. A bi-directional DC/DC converter capable of bi-directional power supply between a first DC voltage source and a second DC voltage source through an isolation transformer, the bi-directional DC/DC converter comprising:
a first bridge circuit composed of a plurality of semiconductor switching elements connected to the first DC voltage source;
a second bridge circuit composed of a plurality of semiconductor switching elements connected to the second DC voltage source;
the isolation transformer connected between an AC side of the first bridge circuit and an AC side of the second bridge circuit;
an LC resonance circuit composed of at least one set of a reactor and a capacitor connected between the AC side of the first bridge circuit and the isolation transformer or a reactor and a capacitor connected between the AC side of the second bridge circuit and the isolation transformer;
a first detection circuit for detecting a voltage and a current of the first DC voltage source;
a second detection circuit for detecting a voltage and a current of the second DC voltage source;
a first control circuit for controlling the semiconductor switching elements of the first bridge circuit; and
a second control circuit for controlling the semiconductor switching elements of the second bridge circuit; wherein
the first control circuit has a control means for performing fixed frequency control of the semiconductor switching elements of the first bridge circuit at around a resonance frequency of the LC resonance circuit, and a control means for performing frequency modulation control of the semiconductor switching elements of the first bridge circuit at a frequency lower than the resonance frequency;
the second control circuit has a control means for performing fixed frequency control of the semiconductor switching elements of the second bridge circuit at around the resonance frequency of the LC resonance circuit, and a control means for performing frequency modulation control of the semiconductor switching elements of the second bridge circuit at a frequency lower than the resonance frequency;
the first control circuit also has a first change-over means for performing change-over of the first bridge circuit between the fixed frequency control and the frequency modulation control based on a magnitude of a control variable determined according to detected values by the second detection circuit in a mode of supplying electric power from the first DC voltage source to the second DC voltage source;
the second control circuit also has a second change-over means for performing change-over of the second bridge circuit between the fixed frequency control and the frequency modulation control based on a magnitude of a control variable determined according to detected values by the first detection circuit in a mode of supplying electric power from the second DC voltage source to the first DC voltage source.

2. The bi-directional DC/DC converter according to claim 1, wherein
when the first control circuit controls the voltage of the second DC voltage source at a value higher than a maximum voltage that can be delivered in a range of the fixed frequency control of the first bridge circuit, the first control circuit operates the first change-over means to change-over a control mode for the first bridge circuit from the fixed frequency control to the frequency modulation control.

3. The bi-directional DC/DC converter according to claim 2, wherein
when the second control circuit controls the voltage of the first DC voltage source at a value lower than a minimum voltage that can be delivered in a range of the frequency modulation control of the second bridge circuit, the second control circuit operates the second change-over means to change-over a control mode for the second bridge circuit from the frequency modulation control to the fixed frequency control.

4. The bi-directional DC/DC converter according to claim 2, wherein
the fixed frequency control is carried out by controlling the semiconductor switching elements by means of pulse width modulation.

5. The bi-directional DC/DC converter according to claim 2, wherein
the fixed frequency control is carried out by controlling the semiconductor switching elements by means of phase modulation.

6. The bi-directional DC/DC converter according to claim 1, wherein
when the second control circuit controls the voltage of the first DC voltage source at a value lower than a minimum voltage that can be delivered in a range of the frequency modulation control of the second bridge circuit, the second control circuit operates the second change-over means to change-over a control mode for the second bridge circuit from the frequency modulation control to the fixed frequency control.

7. The bi-directional DC/DC converter according to claim 3, wherein
the fixed frequency control is carried out by controlling the semiconductor switching elements by means of phase modulation.

8. The bi-directional DC/DC converter according to claim 6, wherein
the fixed frequency control is carried out by controlling the semiconductor switching elements by means of pulse width modulation.

9. The bi-directional DC/DC converter according to claim 1, wherein
the fixed frequency control is carried out by controlling the semiconductor switching elements by means of pulse width modulation.

10. The bi-directional DC/DC converter according to claim 1, wherein
the fixed frequency control is carried out by controlling the semiconductor switching elements by means of phase modulation.

11. An apparatus, comprising:
a bi-directional DC/DC converter configured to supply power bi-directionally between a first DC voltage source and a second DC voltage source; and
a control device configured to change one of modes of frequency control associated with operation of the bi-directional DC/DC converter, based on a control variable corresponding to a detected voltage value at one of the first DC voltage source or the second DC voltage source;
wherein the modes of frequency control include a fixed frequency control mode and a frequency modulation control mode;
wherein the control device comprises at least one control circuit configured to change a mode of frequency control from the frequency modulation control mode to the fixed frequency control mode if the detected voltage value is smaller than a reference value, and to change the mode of frequency control from the fixed frequency control mode to the frequency modulation control mode if the detected voltage value is not smaller than the reference value; and
wherein the bi-directional DC/DC converter is configured to, in the frequency modulation control mode, operate at a frequency lower than a resonance frequency.

* * * * *